W. O. Leslie,
Brick Machine.
Nº 80,977.   Patented Aug. 11, 1868.
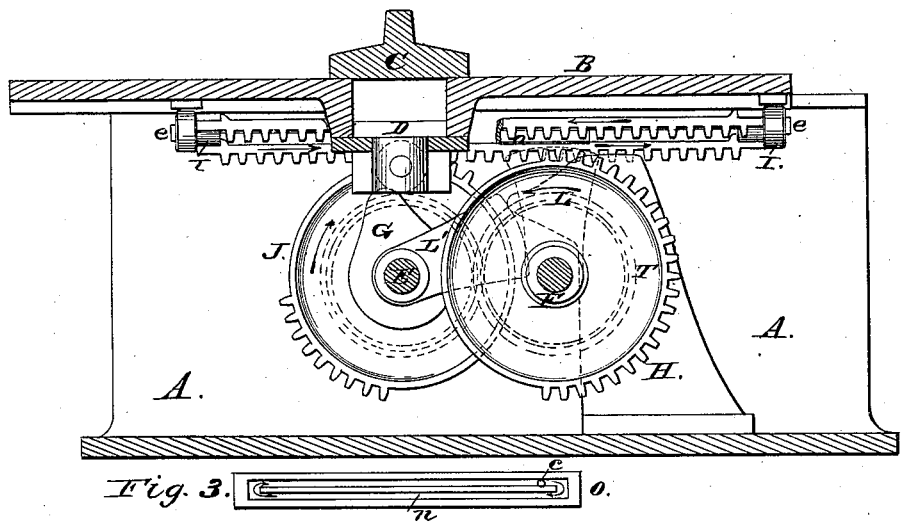
Fig. 1.
Fig. 3.
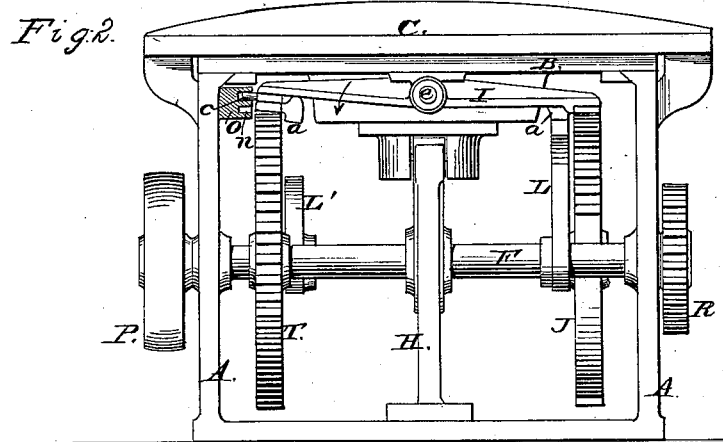
Fig. 2.
Witnesses:
L. Hailer,
P. T. Dodge.
Inventor:
W. O. Leslie.
by Dodge & Munn
his Attys.

United States Patent Office.

W. O. LESLIE, OF PHILADELPHIA, PENNSYLVANIA.

Letters Patent No. 80,977, dated August 11, 1868.

IMPROVED BRICK-PRESS.

*The Schedule referred to in these Letters Patent and making part of the same.*

TO ALL WHOM IT MAY CONCERN:

Be it known that I, W. O. LESLIE, of Philadelphia, in the county of Philadelphia, and State of Pennsylvania, have invented certain new and useful Improvements in Brick-Presses; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention has for its object the production of a machine for re-pressing brick, that will accomplish the work with rapidity and efficiency; and the invention consists in a novel arrangement of mechanism, whereby a reciprocating motion is imparted to a table having a mould in it, by which the brick is carried under a stationary plate, then pressed, then carried from under the plate, and automatically removed from the mould, as hereinafter more fully described.

In the accompanying drawings—

Figure 1 is a side elevation, with the side of the frame removed, and shown partly in section, to show the interior arrangement of mechanism.

Figure 2 is an end view, and

Figure 3 is a side view of a piece detached.

In constructing my machine, I provide a suitable frame, A, upon which I mount a reciprocating table, B, having a mould formed in its centre, as shown in fig. 1. Transversely of the table, and directly over it, is secured a strong plate, C, which is fastened securely at each end to the side plates of the frame, as represented in fig. 2, this plate fitting close down to the upper side of the table B, but not so as to prevent the latter from moving freely.

To the under side of this table is secured a tilting-rack, I, having a rack-bar at each side, the rack being pivoted at the centre of each end, as shown at $e$, figs. 1 and 2. Upon one side of the frame A, near the top, and alongside of the rack I, is rigidly fastened a guide-plate, O, having grooves, $n$, cut in its inner face, as shown in fig. 3. From the side of the rack a pin, $c$, projects, with its end fitting in the groove $n$, as shown in fig. 2.

Transversely of the frame are mounted two shafts, E and F, which have secured to their outer ends gear-wheels, R, of equal size, engaging together, so that when motion is imparted to one, it will cause the other to rotate at the same speed, but in the opposite direction. Upon the shaft F is secured a wheel, T, which has teeth extending half way around its periphery, arranged to engage with the teeth of the rack on that side, when the latter is depressed on that side, as will be hereinafter explained. On the same shaft, at the opposite side, is secured a cam, L, arranged to strike against a projection, $a$, on that side of the rack, at the instant the table has moved its entire distance, at which time the pin $c$ will have arrived at the end of the groove $n$ in the guide-plate O, and thus the cam L will tilt the rack I, causing the bar on the opposite side to drop down and engage with a wheel, J, mounted on the other shaft, E, at the opposite side; there being a similar cam, L', secured on this shaft E, which in like manner tilts the frame back again, when it is ready to move in the opposite direction; the pin $c$ being in the lower groove, $n$, when the rack is in gear with the wheel T, and in the upper groove when the rack is in gear with the wheel J; the cams L and L' being so arranged in relation to each other, and to the wheels T and J, as to strike the projections $a$ on the rack I, and tilt it just at the instant the pin $c$ arrives at the respective ends of the grooves $n$; the pin working in these grooves, and serving to hold the rack in gear with its wheel on the one side or the other, after the cam that tilted it has passed, and until the table and rack have completed their movement in that direction. At that instant the other cam will tilt the rack again, which will thereby be thrown into gear with the wheel on the other shaft, and the table thus be moved back, and thus the table is caused to move continuously back and forth.

It will be observed that the wheel J, instead of having its teeth arranged like those on wheel T, has them disposed in two groups, about equidistant, as shown in fig. 1, the result of which is, that when the table is moved by the wheel J, it will have an intermittent motion, one set of the teeth moving it far enough to bring the mould under the plate C, when it will remain stationary for a brief period, while a cam, G, on the same shaft with wheel J, strikes against a friction-roller in the lower side of the follower D, fitted in the bottom of the mould, and presses the brick up against the plate C, and as soon as the cam G has passed, the other group of teeth will engage with the rack, and move the table far enough to bring the mould out from under the plate C.

At the end of the frame where the mould will be after the brick is pressed and brought out from under the plate C, there is secured an upright, H, the top of which is inclined, as shown in dotted lines in fig. 1, it being so located that, as the mould passes from under the plate C, the lower end of the follower D will strike upon the incline, and thus be shoved up in the mould, raising the brick out, when it is removed by the attendant.

The machine may be operated by hand, though I intend it to be driven by power; a pulley, P, on one of the shafts, E or F, serving to connect it with any suitable power by a belt.

The operation is as follows:

The table is run back to the left-hand end of the machine, as it appears in fig. 1, until the mould is out from under the plate at which time the follower drops down to the bottom of the mould. A brick is then placed in the mould, and is carried with the table under the plate C, where it is pressed by the cam G, the table remaining stationary while the brick is being pressed, after which it is again carried forward, and is ejected by the stationary incline or cam H forcing the fallow D up flush with the surface of the table on the opposite side of the plate C.

It should also be remarked that the teeth on the wheels T and J are so arranged as to permit the table B to remain stationary for a brief period as it reaches the limit of its movement in each direction, thus allowing the brick to be inserted in and removed from the mould with less danger of injuring them. This interval may be made more or less by making a greater or less space between the groups of teeth on the wheels T and J.

By this plan I am enabled to construct a machine that performs the work in a very perfect manner and with great rapidity.

Having thus described my invention, what I claim is—

1. The tilting-rack I, constructed and arranged to operate substantially as described.

2. The combination of the stationary plate C, sliding table B, with the mechanism for operating the same, and the cams G and H, when arranged for joint operation, substantially as set forth.

W. O. LESLIE.

Witnesses:
 JOSHUA SPERING,
 JNO. BROWN.